Aug. 6, 1940.  O. D. STORZ  2,210,185
BAND SAW GUIDE
Filed June 3, 1938
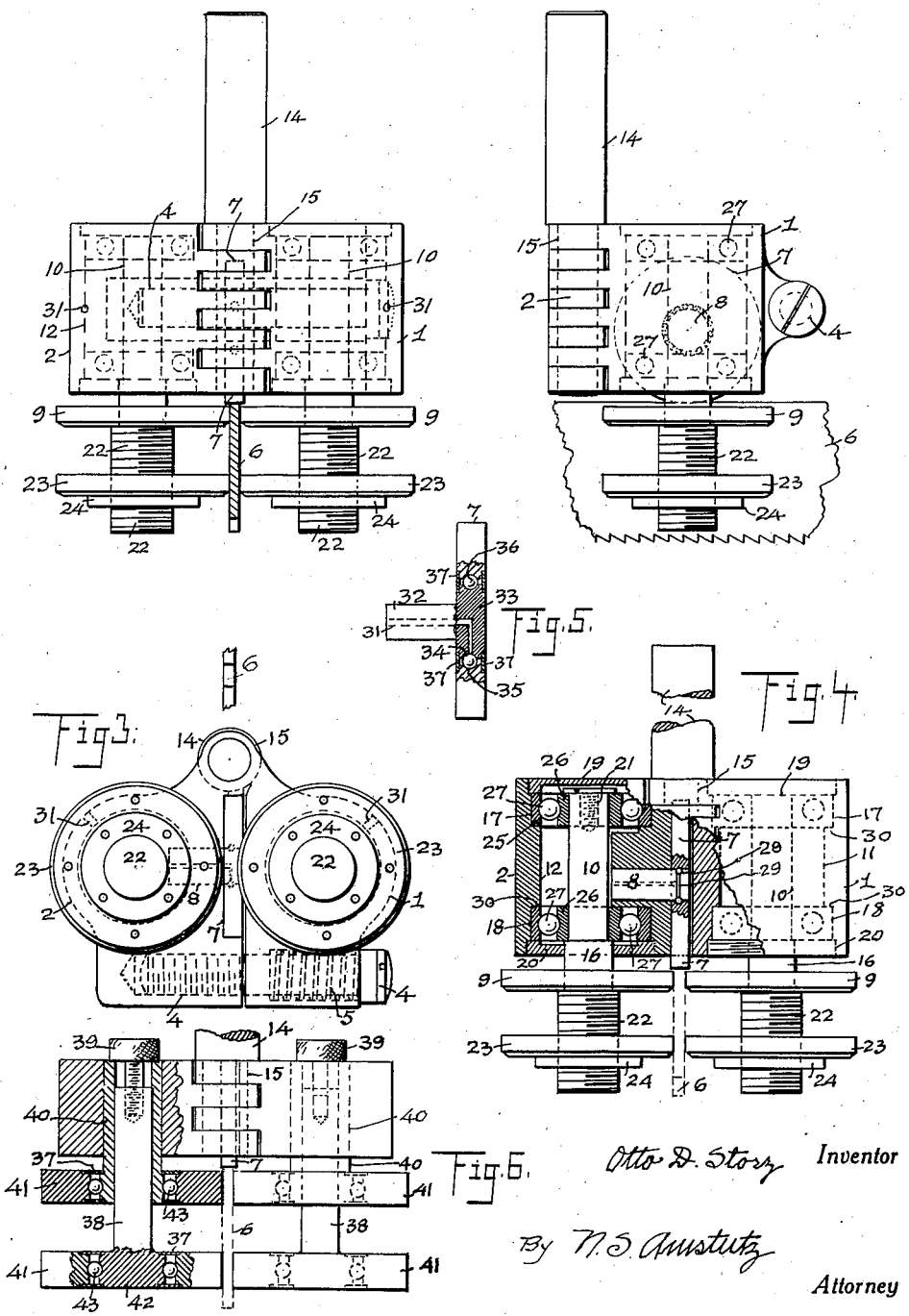
Otto D. Storz Inventor
By N. S. Amstutz
Attorney Patented Aug. 6, 1940

2,210,185

UNITED STATES PATENT OFFICE 2,210,185

BAND SAW GUIDE

Otto D. Storz, Valparaiso, Ind.

Application June 3, 1938, Serial No. 211,542

8 Claims. (Cl. 143—165)

My invention relates to improvements in band saw guides and it more especially includes the features pointed out in the claims.

The purpose of my invention is to provide a rolling edge guide and rolling side guides with an automatic tension on the side guides and provide supplementary side guides for extra width band saws and I also provide an automatic take-up to adapt the side roller guides to different thicknesses of saws, and I provide means for aligning the guide to the plane of travel of the saw and I position the guides so as to contact the saw on its edge and sides on the same horizontal plane.

In referring to the rotatable guides I use the names rollers, wheels and disks or side and edge bearing means interchangeably.

With these ends in view I illustrate in the accompanying drawing such instances of adaptation as will disclose the broad features of the invention without limiting myself to the specific details shown thereon and described herein.

Fig. 1 is a top plan view.

Fig. 2 is a side elevation of Fig. 1.

Fig. 3 is a front elevation.

Fig. 4 is a plan view in section.

Fig. 5 is an enlarged section of the edge guide wheel provided with a dustproof type of ball bearing.

Fig. 6 is a plan view partly in section of a modified form of roller or wheel support, in which the spindle is stationary but adjustable endwise to position the rotatable guides in different positions to compensate for variations in saw width.

In using my band saw guide I may employ whatever alternatives or equivalents of structure that the exigencies of varying conditions may demand without departing from the broad spirit of the invention.

My guide comprises a right hand part 1 and a left hand part 2, both are hinged together at 3 for movement on a horizontal axis. These parts at a distance from the hinge are held against undesired separation by means of an adjusting screw 4 and they are maintained under tension by a spring 5 which tends to force them toward each other so as to compensate for varying thicknesses of saw-blades 6.

Instead of using stationary friction guides as has been done heretofore I only employ disk roller or wheel guides which rotate on ball bearings. The roller 7 for the saw edge rotates on a horizontal axis 8 and to accommodate saw thicknesses each one of the side rollers 9 also rotates on a horizontal axis 10 at right angles to the axis 8. The edge roller 7 has a bearing in the left hand part 2. Each one of the guide parts 1 and 2 approximate individual tubes 11 and 12 with a clear opening therethrough excepting the left hand one 12 into which the bearing 13 for the edge roller axis 8 extends.

The left hand part 2 has a rearward projection by means of which the guide 14 is secured to the existing band-saw frame in any suitable manner. This may be varied to adapt the guide to different saw frames, as desired. It is an extension of the pivot pin 15, Figs. 1 and 3. The stem 14 is round as shown in Fig. 3. It is attached onto an existing saw frame by any conventional clamp around the stem 14 which on account of the roundness of the stem permits an adjustment of the entire guide, as a unit around the axis of the stem 14 and its extension 15. The pin 14, its reduced diameter 15, and the left hand casing 2 pressed onto 15, constitute a first unit. The second casing 1 is pivoted on the reduced diameter 15 in interlaced relation to the part 2 so as to have movement around the axis of the extension 15 independent of the casing 2. Thus the parts 1 and 2 in their assembled relation form a complete operative unit.

The guide wheels or rollers 8 and 9, as stated, are adapted to different cross sections of the saw 6. The thickness of the edge guide wheel 7 is greater than the maximum thickness of the saw 6 that is used. The side wheels 9 are adjusted for different saw thicknesses over a range that comes within the thickness of the edge wheel 7.

The guide wheel disks 9 are pressed onto the horizontal spindles 10 at 16. These spindles rotate in any desired type of ball bearings 17 at the rear end and similar ball bearings 18 at the front end. The bearings 17 and 18 are held in place, respectively by screw plates 19 and 20. At the rear end of the spindles 10 screws 21 enter the spindles, holding them in place as the heads of the screws are seated against the inner ball race ring of the bearings 17. The spindles 10 are slightly smaller in diameter than the portion 16 on which the rollers 9 are pressed. In front of the rollers 9 the diameter of the spindles is increased at 22 where they are threaded, to receive the supplemental threaded guide rollers 23. These rollers are held where desired for different width of saws 6 by threaded locking disks 24.

The bearings 17 and 18 include outer rings 25, inner rings 26 and balls 27. The edge roller 7 rotates on balls 28 in ball race 29 on the stationary spindle 8. The ball rings 25 abut shoulders 30 of the tubes 11 and 12. The front cap 20 has an opening through which the portion 16 of the shaft 10 passes. The rollers 23 and disk nuts 24 have openings in their faces for the reception of spanner wrenches, whenever it is deemed desirable to shift the rollers inward for narrower width saws.

The tubular chambers 11 and 12 serve as oil reservoirs. Oil is admitted through openings 31. Oil from the chamber 12 may pass through an opening in the pin 8 to lubricate the bearing for the rotatable edge guide 7. In order to provide a dust proof type of ball bearing for the member 7, a spindle 32 is used. It has an enlarged diameter 33 on which a ball race 34 is formed. The edge guide 7 has a companion ball race 35. Both races accommodate balls 36. The space between the outer diameter of the enlargement 33 and the inner diameter of the opening in 7 is closed by ring plates 37 which completely seal off this annular opening.

The modified form of guide shown in Fig. 6 comprises a two part structure similar to that shown in Figs. 1 to 4 inclusive but instead of the casing having tubular openings, the two members are formed relatively solid. Each one has a non-rotative spindle 38 adjustable endwise by a screw 39. The front end of each half of the casing is provided with a pressed in tubular ball race 40 on which a rotatable guide 41 has bearing. The outer end of the stationary spindle 38 is enlarged at 42 and on its circumference a ball race is formed to accommodate in combination with the auxiliary guide 41, a second ball bearing on the spindle 38.

The adjustment of the guides 41 toward or away from each other is practically the same as in the case of the parts 1 and 2 shown in Figs. 1 to 4 inclusive. The compensation for different widths of saws is secured by moving the spindle 38 lengthwise instead of moving the disks 23 endwise on the threaded spindles 22 as shown in Figs. 1 and 4.

The broad idea of the invention is to secure the cooperation of means for automatically compensating for different saw thicknesses, separately and adjustably compensating for different saw widths and for the alignment of the guide to the plane of traverse of the saw while retaining the points of contact against the saw edge and its sides on the same horizontal plane.

Hinging the parts 1 and 2 together and interposing a spring tension tending to move the parts toward each other prolongs the life of a band saw because any inequalities of the thickness where the band has been brazed or otherwise joined is automatically compensated for. This results in a continuous use of a band saw for months without breakage while in the use of fixed guides whether rollers or flat limiting members the breakage of saws is quite frequent due to the unyielding guides.

As stated above an outstanding feature of my invention is the fact that the edge roller or wheel engages a saw edge on the same horizontal plane as the side rolling wheels which results in a uniform guide control that avoids side twists or tendency to buckle, thus increasing the life of a saw of this type under the heaviest duty.

By forming the support 14 as an extension of the pivot 15 the entire guide is easily brought into alignment with the saw traverse to compensate for any wear of the lining of the supporting wheels over which the band saw travels.

What I claim is:

1. A band saw guide comprising a two-part member, means for hinging one part to the other, a pin for the hinge, an extension of the pin adapted to form a support for attaching the guide to a band saw frame, an edge guide roller having bearing between the members, a side roller on the same member, a companion guide roller on the other member, and means for adjustably holding the side rollers against the faces of the saw band under selective tension.

2. A band saw guide comprising a member having an edge guide roller, a side guide roller on its face rotatable on the same plane at approximately 90 degrees from the axis of the edge roller, another member, a side roller on its face, interlacing parts of each member forming a hinge, a pin for the hinge, said pin forming a support for the complete guide, and means for placing both members under yielding tension and limited movement to insure that both side guide rollers will automatically accommodate different saw thickness between them.

3. A two-part saw guide, a hinge joining the parts, means for limiting the movement of the parts on the hinge, a pin for the hinge, an extension of the hinge forming a support for the guide, a pair of side guide rollers, one on each part, and an edge guide roller rotatable against the edge of the saw approximately at right angles to the side guide rollers.

4. In band saw guides, a two-part member, a hinge for pivoting the parts together, means for placing the parts under tension tending to draw the parts toward each other, oppositely positioned cooperating rollers respectively on each part adapted to engage the sides of a saw blade, and an edge guide roller between the parts rotatable against the saw edge.

5. In band saw guides a suitable two-part casing, hinging means for pivoting the parts to each other, means for yieldingly placing the parts under tension tending to continuously move them toward each other, a side bearing roller on each part, the periphery of such rollers engaging the side faces of a saw blade passable therebetween, an edge bearing roller on one of the parts so positioned for rotation that the face of the roller is parallel with the face of the saw, and means for maintaining the axes of rotation of all the rollers on substantially the same plane.

6. In band saw guides a pair of frame members in pivoted relation to each other, means for placing the members under tension tending to continuously press them toward each other, a pair of side bearing rollers positioned respectively one on each member, a rear edge roller positioned on one of the members adapted to engage the non-cutting edge of the saw on a plane parallel to the axis of rotation of said roller, all of the rollers being so positioned that their axes are on the same horizontal plane to thereby contact the rollers against the saw at points immediately adjacent each other on such plane, and a pivoting projection extending rearward from the frame whereby the frame and rollers may be swung around the pivot as a unit to laterally align the contacting peripheries of the side bearing rollers adjacent the normal lengthwise path of travel of the band saw.

7. A band saw guide including a pair of frame members, rotatable guide means on one frame member, similar rotatable guide means on the adjacent frame member said guide means being positioned opposite each other to guide a band saw therebetween, means for hingedly mounting said frame members to each other, and means for yieldingly pressing one member toward the other to thereby position the rotatable guide means against opposite faces of the saw to thereby adapt the space between such rotatable guide means to any varying thicknesses of the saw.

8. A first casing, a second casing, means for supporting the casings in hinged relation to each other, an extension from the hinge for pivotally supporting the casings as a unit, means for adjusting the casings toward each other against the tension of a spring, a spindle in each casing, a pair of side bearing rollers on each spindle so positioned that the rollers on one spindle are positioned opposite the rollers on the other spindle, means for adjusting the rollers on each spindle to accommodate saws of different widths, and rotatable means engaging the edge of the saw on a plane parallel to the axis of rotation of said rotatable means, said edge and side bearing rotatable means being adapted to engage the saw on approximately the same horizontal plane whereby the side bearing rollers and the casings are movable as a unit with the extension.

OTTO D. STORZ.